Oct. 8, 1963 J. E. BRITT 3,106,608

PULSE DISTORTION MEASURING DEVICES

Filed Sept. 8, 1961 2 Sheets-Sheet 1

INVENTOR

James Edward Britt

BY Martha L. Ross

AGENT

PULSE DISTORTION MEASURING DEVICES

Filed Sept. 8, 1961

INVENTOR
James Edward Britt

BY Martha L. Ross
AGENT

United States Patent Office 3,106,608

Patented Oct. 8, 1963

3,106,608

PULSE DISTORTION MEASURING DEVICES

James Edward Britt, Alexandria, Va., assignor to Atlantic Research Corporation, Fairfax County, Va., a corporation of Virginia Filed Sept. 8, 1961, Ser. No. 136,764

11 Claims. (Cl. 178—69)

The present invention relates in general to pulse distortion measuring equipment, and more particularly to apparatus for measuring and indicating distortion of marking or spacing pulses in code signals such as those used in teletypewriter or data transmission systems.

For effective control and trouble shooting of circuits of the type encountered in teletypewriter and data transmission systems employing coded trains of impulses, it is useful to be able to detect reliably the existence of distortion of the signal impulses. There are several basic types of distortion which affect the reliability of telegraph and data signals to produce proper operation of the system components. A common feature of each of these types of distortion is that the marking or spacing pulses are lengthened or shortened by the distortion, either in a uniform or a random manner. By measuring the pulses by comparing, in some way, the shortest pulse of a series of pulses with a standard or unit pulse length, the amount of distortion can be discerned. This technique of measuring the shortest pulse affords a means of detecting the basic types of telegraph signal distortion with a reasonable sampling of pulses.

Efforts have been made heretofore to provide a reasonably accurate device which could be widely furnished to field test men for measuring and indicating signal distortion of such telegraph and data pulse signals, but prior devices have been highly complex, expensive and bulky to transport. Further, many of the devices heretofore proposed have operated on only marking pulses or spacing pulses, but not both, so that these devices were limited in their application because of the requirement that the signals have a particular formation. Such prior art devices frequently relied upon a flashing signal lamp to indicate the occurrence of shortened pulses. This, however, produced substantial battery drain and, therefore, increased the size or number of batteries required, and did not provide an indication of a nature that could be readily depended upon for checking the need for calibration or battery replacement.

In co-pending application, S.N. 56,137, filed September 15, 1960, by Horace J. Britt, entitled Measuring Devices, and assigned to the assignee of this invention, there is disclosed a novel pulse distortion measuring apparatus wherein there is provided an indicating meter which is deflected to indicate the occurrence of shortened pulses. A disadvantage of this type of measuring is that while the presence of distortion above a selected percentage may be ascertained, the exact percentage that a mark or space pulse is distorted is unknown.

An object of the present invention, therefore, is the provision of novel pulse distortion measuring apparatus, for the use by field test men in accurately measuring distortion of telegraph signal pulses, which is small, battery operated and free from relay maintenance, and is of highly compact construction to permit the apparatus to be carried readily in the field.

Another object of the present invention is the provision of a novel transistorized pulse distortion indicating instrument for accurately measuring and indicating the occurrence of either marking pulses or spacing pulses which are shorter than a selected reference pulse length in a teletypewriter or data code pulse signal.

Another object of the present invention is the provision of a novel pulse distortion measuring instrument for accurately measuring and indicating the occurrence of shortened marking or spacing pulses in a teletypewriter or data signal, wherein the instrument is provided with an indicating meter which is calibrated in percent distortion to give a direct reading of the distortion present, which reduces battery drain relative to that encountered with flashing lamp indicators, and which provides convenient means for checking the need for calibration and battery replacement.

Other objects, advantages and capabilities of the present invention will become apparent from the following detailed description, taken in conjunction with the accompanying drawings illustrating two exemplary embodiments of the present invention.

Figure 1:
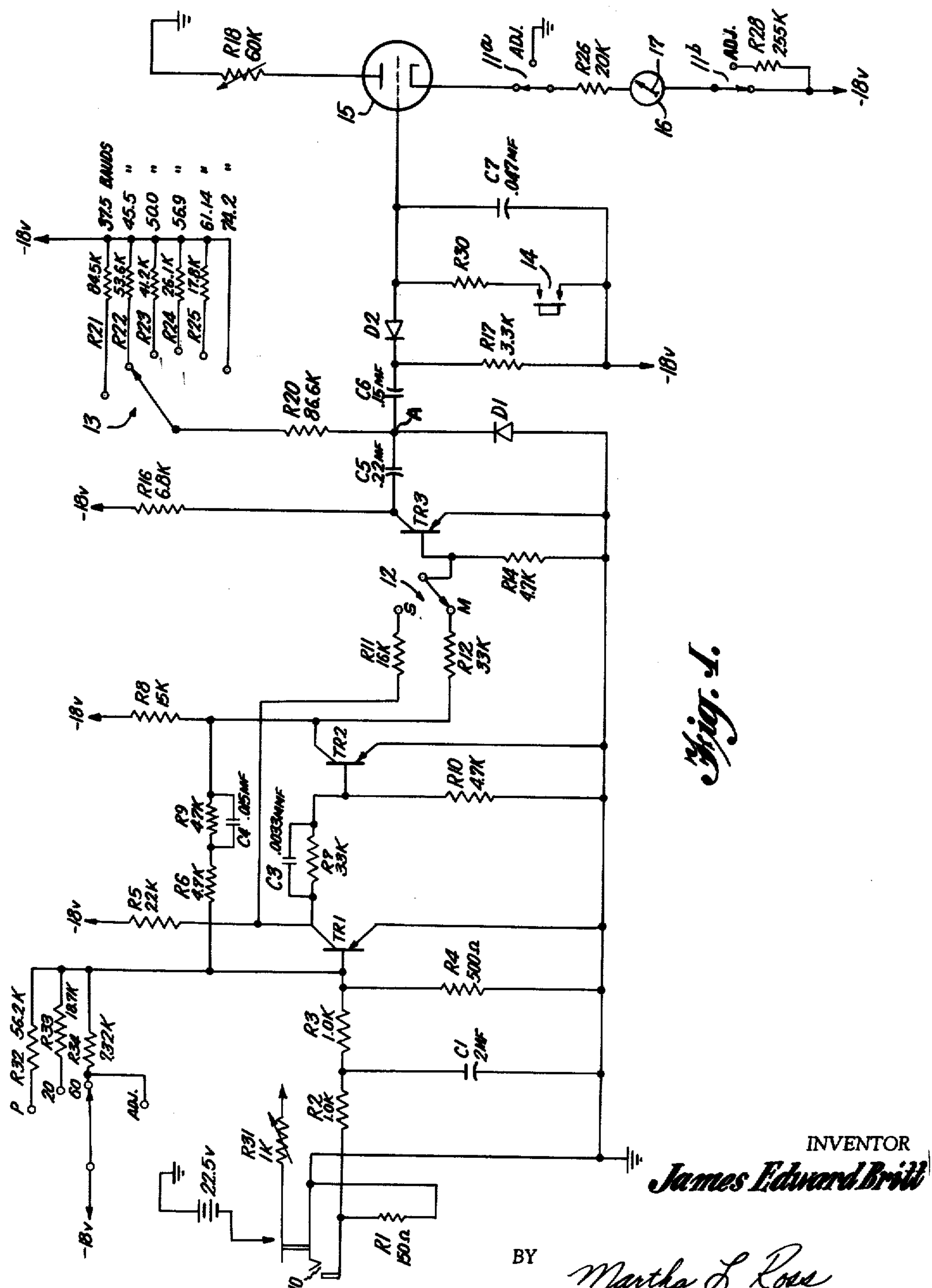
FIGURE 1 is a schematic diagram of one form of the present invention.

Referring to FIGURE 1, the device of the present invention is a signal distortion indicator for use by field test men in monitoring any level impulse code teletypewriter signals at various transmitting speeds to determine whether the mark pulses or the space pulses are shorter than a selected reference length. A Mark-Space switch is provided to permit selection of whether the apparatus will respond to marking pulses or spacing pulses. A three-bank input selection switch having, for example, four positions is provided to set the apparatus to measure pulses of 20 ma. level at one position, pulses of 60 ma. level at another position, and pulses varying above and below zero at a position labeled "Polar." This switch also has a fourth position for checking battery voltage. The circuit, in general, comprises a normally non-conducting input transistor to which signals are fed through a time delay network, a first transistor which is turned off in response to switching of the input transistor to conducting state, a switching transistor responsive to the input transistor or the first transistor, depending upon the setting of the Mark-Space switch to apply voltages to a first timing capacitor in selected relation to transitions of the incoming signal between marking and spacing levels, a second timing capacitor responsive to conditions of the first timing capacitor and a meter circuit, including a triode and a microammeter graduated in percent distortion, which responds to voltage pips produced in response to conditions of the second timing capacitor, when pulses of shorter than unit or other selected reference length are monitored, to produce stable deflection of the meter pointer. A manual adjustment for a potentiometer in the discharge circuit of the timing capacitors is calibrated for various transmitting speeds.

In the ensuing description of the components and operation of the circuit, the components will be described generally in the order they are encountered by the incoming signals. For convenience, it will be assumed that the set is connected to a 60 ma. neutral teletypewriter circuit and the Mark-Space switch is in the Mark position wherein the set measures marking distortion. An input plug, not shown, in input jack 10 allows the battery voltage to be applied to the circuit. The signals are introduced through input jack 10 interposed in a voltage divider network including resistors R1, R2, R3, R4 and either resistor R32, R33 or R34, as determined by the setting of the moveable contact of input selector switch 11 having "Polar," 20 ma., and 60 ma. positions respectively. A fourth position labeled "Adj." is provided for adjusting the battery voltage level by variable resistor R31 as later described. The signals coupled through the jack 10 are applied to the base of transistor TR1 whose collector is connected through R5 to −18 volt potential source, and whose emitter is connected directly to circuit ground (not earth ground). The base of transistor TR2 is connected to the collector of transistor TR1 through resistor R7, in parallel with capacitor C3, and to ground through resistor R10, its emitter is connected directly to ground, and its collector is connected to the −18 volt source through resistor R8.

The base of transistor TR1 is connected to the collector of transistor TR2 through resistor R6 and resistor R9 which is in parallel with capacitor C4. The collector of transistor TR1 is connected to terminal S of the Mark-Space switch 12 through resistor R11. The collector of transistor TR2 is connected through resistor R12 to terminal M of the Mark-Space switch 12. The switch 12 applies the voltages at the collector of either transistors TR1 or TR2 to the base of transistor TR3 which is connected to ground through resistor R14. The emitter of transistor TR3 is grounded, and the collector is connected to the −18 volt source through resistor R16 and to the left side of timing capacitor C5.

The right side of timing capacitor C5 is connected at point A to the −18 volt source through resistor R20 and potentiometer 13 which is calibrated for different transmission speeds. Here, it is assumed that potentiometer 13 is set at 60 words per minute (45.5 bauds). Timing capacitor C5 is also connected at point A to diode D1 which holds point A from going below essentially ground potential. The left side of capacitor C6 is connected to the right side of capacitor C5 at point A.

The right side of timing capacitor C6 is connected to the −18 volt source through resistor R17 and to a storage capacitor C7 and the grid of triode 15 through diode D2. A resistor R30 and a normally open reset switch 14 parallel capacitor C7. The plate of triode 15 is grounded through resistor R18, and the cathode is connected to the −18 volt source through resistor R26 and microammeter 16 having a deflectable pointer 17.

In measuring shaped pulses, it is important that transistor TR1 trigger at the half current level to simulate the operation of relays used in teletypewriter system components. Resistors R32, R33 and R34 associated with switch 11 provide the proper bias on transistor TR1 for a half current triggering level for 20 ma., 60 ma., and polar signals. Switches *11a* and *11b* in the meter circuit move in conjunction with switch 11 to the "Adj." position whereby the variable resistor R31 may be adjusted until the meter reads 0% distortion to insure the exact operating voltage of −18 volts. Resistors R2, R3 and capacitor C1 introduce a time delay of about one millisecond in the response of transistor TR1 to teletypewriter signal transitions so as to prevent transistor TR1 from operating falsely due to short interruption of the pulse, as, for example, from relay bounce.

In operation, when the circuit goes marking, the 60 ma. current produces a voltage across input resistor R1 that overcomes the forward bias supplied through resistor R34 from the −18 volt source, thus turning off transistor TR1. When transistor TR1 is off, the −18 volt source through resistors R5 and R7 supplies base-emitter current to transistor TR2, turning it on. When transistor TR2 is on, its collector is essentially at ground potential and base-emitter current to transistor TR3 is cut off. Thus, transistor TR3 is off.

Resistors R10 and R14 connected between the base and emitter circuit of transistors TR2 and TR3, respectively, reduce the collector leakage current of these transistors when they are in their off condition.

Since transistor TR3 is off, capacitor C5 is charged to substantially −18 volts by the −18 volt source through resistor R16 and conducting diode D1. Capacitor C6 always has substantially an 18 volt charge across it due to the charge path from the −18 volt source, through resistor R17 and diode D1. Thus, the left side of capacitor C5 and the right side of capacitor C6, as, viewed in the drawing, are at −18 volts, and the right side of capacitor C5 and the left side of capacitor C6, being point A, are at ground potential. Capacitor C7 is uncharged as the −18 volt source appears at both terminals. Conduction in tube 15 is not affected and the meter reading is unchanged.

When the teletypewriter circuit goes spacing and the voltage across resistor R1 drops toward zero, the −18 volt source through resistor R34 forward biases transistor TR1 and turns it on at essentially the midpoint on the current wave form. As transistor TR1 turns on, its collector voltage drops to essentially zero, removing the base-emitter current of transistor TR2, and thereby turning transistor TR2 off. When transistor TR2 began to turn off, a negative triggering voltage was supplied to the base of transistor TR1 through resistors R8, R6 and the momentarily shorted out (by capacitor C4) resistor R9, causing transistor TR1 to turn on quickly and transistor TR2 to turn off quickly. Capacitor C3 also helps this triggering action by applying a positive pulse at the base of transistor TR2 to help turn it off. When transistor TR2 turns off, the −18 volts through resistors R8 and R12 supplies base-emitter current to transistor TR3, causing it to turn on.

When transistor TR3 turns on, the left side of capacitor C5 goes to essentially ground, and point A goes to essentially +18 volts momentarily. Diode D1, being back biased, cuts off. The +18 volts at point A cause a charge current to flow through capacitor C6 and resistor R17. This charge current diminishes very quickly as point A reaches equilibrium at nearly +10 volts.

The capacitors of C5 and C6 now decay exponentially toward zero. The discharge path for capacitor C5 is from the −18 volt source through potentiometer 13, resistor R20, and the collector-emitter circuit of conducting transistor TR3 to ground. The discharge path for capacitor C6 is from the −18 volt source, through the potentiometer 13, resistors R20 and R17 to the −18 volt source. The resistance values in potentiometer 13 are so chosen that the charge at point A will not fall to ground potential until 1.15 times the theoretical unit pulse length. If the spacing pulse is longer than 1.15 times the theoretical unit pulse length, the positive charge at point A will fall to ground potential by the end of the pulse being measured. If the spacing pulse is shorter than 1.15 times the theoretical unit pulse length, the charge at point A will be at a positive value at the end of the measured pulse.

When the circuit goes marking, transistor TR3 turns off, and its collector rises very quickly to nearly −18 volts. This rise in potential instantaneously causes diode D1 to conduct and point A drops to ground potential. At the end of a long spacing pulse, point A would already be at ground potential. At the end of a spacing pulse shorter than 1.15 times the theoretical unit pulse length, there would be a positive charge remaining at point A and, when point A drops to ground potential, this positive charge appears as a negative charge on the right side of capacitor C6. Since the right side of capacitor C6 is at −18 volts, it goes more negative than −18 volts by the amount of this additional negative charge. Diode D2 conducts, and this voltage that is more negative than −18 volts is dumped into capacitor C7. This negative charge on capacitor C7 drives the grid of triode 15 in a negative direction, reducing the current flowing through the triode 15, and thus through the meter 16.

The meter 16 is calibrated so that as less current flows through the meter 16 a higher distortion reading is indicated by pointer 17. The meter 16 is graduated on its face in percent distortion from a negative to a positive value so that a direct reading of the exact amount of distortion is presented. The deflectable pointer 17 is held deflected at the percent distortion reading by the charge on capacitor C7 which, in the absence of a discharge path, remains in a charged condition. If any charge should leak off of capacitor C7, it will be restored by the voltage created in the next cycle.

If distortion should increase, the positive charge appearing at point A will also increase and, upon becoming a negative charge at the right side of capacitor C6, will cause diode D2 to again conduct. This negative increase will be dumped into capacitor C7, further reducing conduction in the tube 15 and increasing the meter reading to a higher distortion figure. To reset the indicating circuit, reset switch 14 is depressed, which affords a discharge path for capacitor C7 through resistor R30.

It will be noted that the apparatus, when the switch 12 is in the M position to measure marking distortion, actually measures shortened spacing pulses. Since distortion is defined as pulse lengthening, and since a shortened space implies a comparably lengthened mark, the measurement is that of marking distortion. To measure the spacing distortion, switch 12 must be in the S position. Here transistor TR3 conducts when transistor TR1, rather than TR2, goes non-conducting, and the apparatus actually measures shortened marking pulses. Measurement of the marking pulse occurs in the same manner as just described for the spacing pulse.

The meter zero is offset because the presence of a non-distorted pulse, since it is less than 1.15 times the theoretical unit pulse length, will cause a charge to occur at point A, resulting in deflection of the meter. A negative reading is obtained when the pulse being measured is in the range from 1 to 1.15 times the theoretical unit pulse length. For example, with the switch 12 in the Mark position, a spacing pulse longer than unity, but shorter than 1.15 times unity, would cause a negative reading of marking distortion which indicates a shortened, rather than a lengthened, marking pulse.

Typical values for the circuit components of an exemplary embodiment of the invention are indicated in the drawing.

Figure 2:
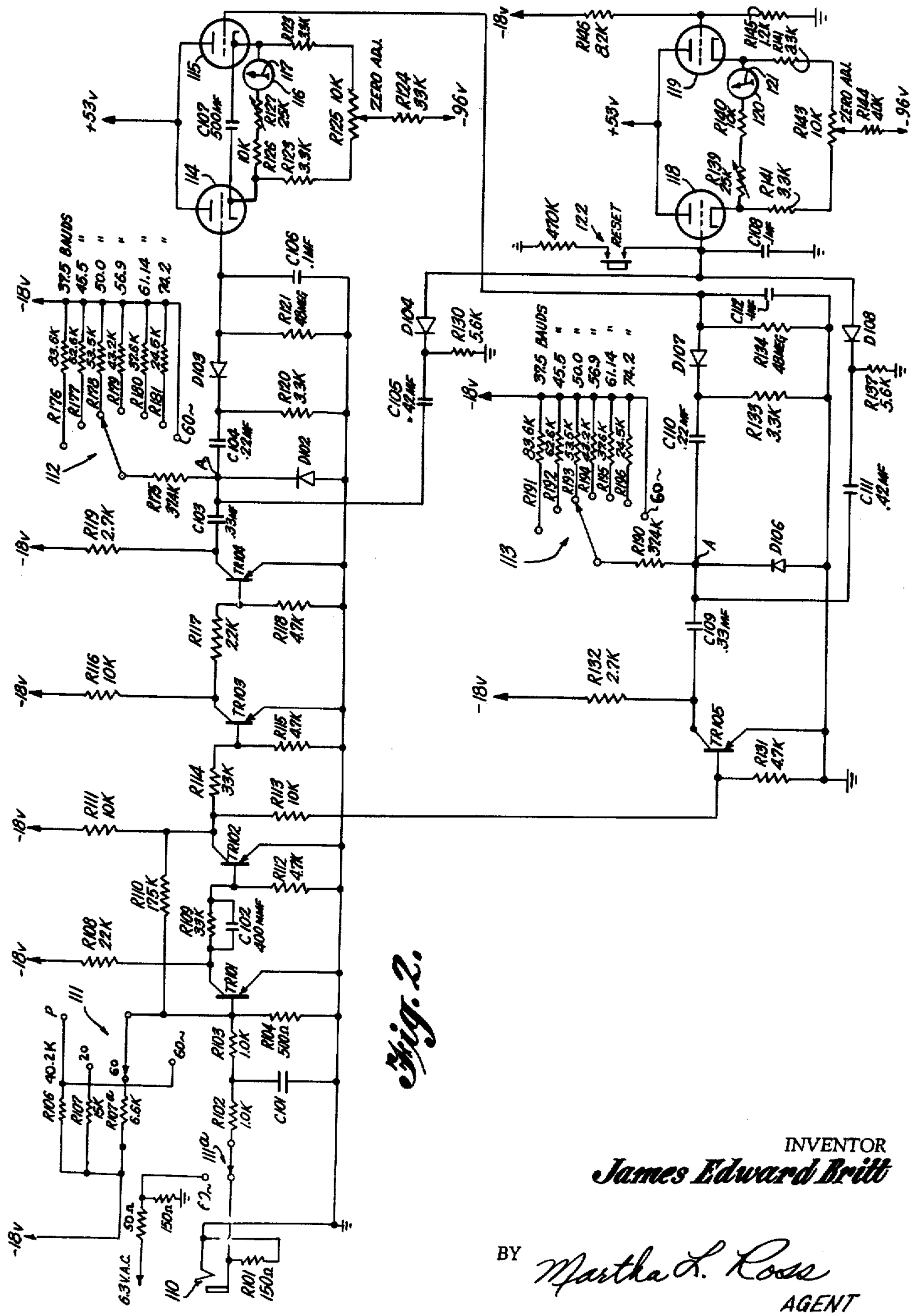
FIGURE 2 is a schematic diagram of another embodiment of the present invention.

FIGURE 2 illustrates schematically a pulse distortion measuring device which is similar in many respects to the previously described embodiment, but which includes a spacing pulse distortion measuring channel and a marking pulse distortion measuring channel, each of which includes indicating circuits for measuring bias and total distortion. The spacing pulse distortion measuring channel includes switching transistor TR104, timing capacitors C103, C104 and C105 and potentiometer 112 and resistors R175, R120 and R130 in the various discharge paths for the timing capacitors. The marking pulse distortion measuring channel includes transistor TR105, timing capacitors C109, C110 and C111 and potentiometer 113 and resistors R190, R133 and R137 in the various discharge paths. Transistor TR103 provides proper phase inversion for transistor TR104 and transistors TR101 and TR102 shape the input pulse to insure a more square wave output at the collector of TR102. The meter circuits have, at their inputs, capacitors C106, C112 and C108 into which any excess negative voltage is dumped as described in the preceding embodiment. The various bias supplies are obtained through rectified 60 cycle, 117 volts A.C. Again, it will be assumed that the set is connected through input jack 110 to a 60 ma. neutral teletypewriter circuit operating at 60 words a minute. The input switch 111 is in the 60 ma. position and the potentiometers 112 and 113 are set at 60 words per minute (45.5 bauds).

Transistor TR101 is non-conducting during the marking condition and conducting during the spacing condition. During the marking condition, it is held non-conducting by the positive voltage developed across the 150 ohm input resistor R101 which overcomes the forward bias supplied to the base of transistor TR101 through resistor **R107*a* from the −18 volt source. This network again insures triggering of transistor TR101 at the half-current level. Switch 111*a*, which is in the position shown, moves in conjunction with switch 111 to the 60 cycle position to perform a calibration check later described. Resistors R102, R103 and capacitor C101** introduce a time delay of one millisecond for the reason advanced in the description of the previous embodiment.

The description which follows covers the circuit operation when measuring marking distortion wherein the shortened spacing pulses give the indication of such distortion. This distortion is measured in the channel controlled by switching transistor TR105. It is to be understood that the operation of the other channel is identical except that spacing distortion is measured.

When transistor TR101 is turned off, transistor TR102 is turned on. The collector of transistor TR102 is essentially at ground potential, thus cutting off transistors TR103 and TR105. With transistor TR105 non-conducting during the marking condition, the left side of capacitor C109 is at essentially −18 volts and point A is at ground due to conducting diode D106. Capacitors C110 and C111 are uncharged due to conducting diode D106.

When the teletypewriter circuit goes spacing, transistor TR101 turns on and transistor TR102 turns off, this switching being accelerated by the negative voltage being applied through resistor R110 to the base of transistor TR101 and the positive pulse being supplied through capacitor C102 to the base of transistor TR102. With transistor TR102 non-conducting, transistors TR103 and TR105 are on. When transistor TR105 goes conducting, the left side of capacitor C109 goes to essentially ground and point A goes to +18 volts momentarily. Diode D105, being back biased, cuts off. The +18 volts at point A cause a charge current to flow through capacitors C110 and C111 and resistors R133 and R137, respectively. This charge current diminishes very rapidly as point A reaches equilibrium at around +10 volts.

The timing capacitors now decay exponentially toward zero. Capacitor C109 discharges from the −18 volt source through potentiometer 113, resistor R190 and conducting transistor TR105 to ground. The discharge path for capacitor C110 is from the −18 volt source through potentiometer 113 and resistors R190 and R133 to ground. The discharge path for capacitor C111 is from the −18 volt source through potentiometer 113 and resistors R190 and R137 to ground. The resistances in potentiometer 113 (as well as in potentiometer 112) are of such a value that at any selected transmitting speed, point A will not discharge to ground potential until 1.35 unit pulse lengths. The reason for using this reference pulse length of 1.35 instead of a unit pulse length reference is to achieve a true bias distortion reading by having two inputs, one for each channel, into the bias distortion meter circuit as described hereinafter. If a unit pulse length reference is used, only one input can be obtained since a shortened pulse will cause a reading and a lengthened pulse will not. However, when using a 1.35 unit pulse length reference, as long as neither the marking pulse nor the spacing pulse is distorted more than 35 percent, then a reading will be obtained from both channels since a charge will remain in one channel when the circuit goes marking, and in the other channel when the circuit goes spacing.

When the circuit goes marking at the end of the spacing pulse, transistor TR105 goes non-conducting, and its collector rises very quickly to −18 volts. This rise in potential instantaneously causes diode D106 to conduct and point A drops to ground potential. If the spacing pulse was shorter than 1.35 unit pulse lengths, there would be a positive charge remaining at point A, and, when point A drops to ground potential, this positive charge appears as a negative charge on the right sides of capacitors C110 and C111. Diodes D107 and D108 conduct, and this negative voltage is dumped into capacitors C112 and C108.

This negative charge on capacitor C108 drives the grid of the triode 118 in a negative direction which unbalances the bridge circuit. The microammeter 121 is a total distortion meter, graduated on its face in percent distortion from a negative value to +50 percent. The level of the voltage pip transferred to capacitor C108 is in direct proportion to the amount of distortion. The higher the level of distortion, the greater will be the deflection of needle 121 and the higher the reading on the meter. The total distortion meter 121 will read the highest level of distortion in the circuit whether it is caused by the marking or spacing channel. Capacitor C108 will stay charged, and the needle 121 is held deflected. Diodes D104 and D108 isolate the channels from each other and also prevent the capacitor C108 from discharging. The capacitor C108 can be discharged by pushing reset switch 122.

Since a charge will be present at point A even with no distortion the meter zero reading is offset so that this charge will deflect the needle 121 to the zero position. It is even possible to obtain a negative reading which shows that one channel actually has a shortened pulse rather than a lengthened pulse. However, this is unlikely because a shortened pulse in one channel will mean a lengthened pulse in the other channel, and, since the total distortion meter 120 reads the highest level of distortion, the charge remaining at point A in the other channel will be greater, causing a positive reading on the meter face.

The negative charge on capacitor C112 drives the grid of triode 115 in the bridge circuit containing meter 116 in a negative direction, reducing the current through this triode. However, a short time later a charge, less negative than the charge from the marking channel, will be applied to the grid of the triode 114 from the spacing channel which reduces the current in this triode, thus counteracting somewhat the negative voltage applied to the grid of triode 115. The meter 116 measures the difference between the two voltages divided by two, which will give the true bias reading by the deflected pointer 117. The meter 116 is a microammeter graduated on its face in percent distortion on both sides of the center zero, one side reading marking bias and the other side reading spacing bias. The large capacitance of capacitor C107 across the meter is to aid in preventing any distortion other than bias from affecting the reading. If additional distortion such as fortuitous distortion is present, any additional charges on capacitors C106 and C112 would be dissipated through resistors R121 and R134 respectively before capacitor C107 could appreciably change its charge, and the needle 117 would remain constant. However, this fortuitous distortion would, as so desired, appear on the total distortion meter 120 since there is no discharge path for capacitor C108. By providing this bias measuring circuit, this equipment can detect and measure accurately any steady-state conditions affecting either the length of the marking or spacing pulse.

To calibrate the equipment, switch 111 can be moved to the 60 cycle position. Switch **111*a* is moved in conjunction with switch 111 to apply a 60 cycle A.C. voltage across the input. This A.C. voltage is obtained from the bias transformer, not shown. When this alternating current emerges from the pulse-shaping circuit of transistors TR101 and TR102, it will be a square wave having a pulse width of 8.33 milliseconds. Potentiometers 112 and 113 are set to the 60 cycle position. The charges remaining on the timing capacitors, after switching occurs, are passed to the various storage capacitors at the inputs to the meter circuits as just described. Since the 60 cycle source is a reliable standard, both meter 116 and meter 120 should read zero distortion. If adjustment is required, resistors R124 and R144 can be varied to return the meters to zero. Resistors R127 and R139, in series with the different meters, are used to adjust the meters 116 and 120 to correct erroneous distortion readings. If potentiometers 112 and 113 are set at the 100 words per minute position (74.2 bauds), then, with a 60 cycle input giving a pulse width of 8.33 ms., the circuits will interpret a short pulse and the total distortion meter 120 will read about 38 percent distortion. If this reading does not occur, resistor R139 can be varied. In the bias meter circuit one input channel has to be disconnected as by a switch, not shown, since two equal inputs would cancel each other to give a zero reading. With one channel disconnected, meter 116** should read one-half of 38 percent or 19 percent distortion. If this reading does not occur, resistor R127 can be varied.

Two specific embodiments of the invention have been shown and described as they apply to the measurement and indication of distortion in teletypewriter pulses. In regard to data pulses, the very same circuitry as described herein would be used with the obvious exception that the input circuitry would be arranged to parallel the circuit to be measured, presenting a high input impedance, rather than connected in series as with teletypewriter circuits, presenting a low input impedance. Different resistance values can, of course, be substituted in switch 111 and potentiometers 112 and 113.

It will be apparent that various modifications may be made within the spirit and scope of the invention and it is desired, therefore, that only such limitations be placed on the invention as are imposed by the prior art and set forth in the appended claims.

I claim:

1. A monitoring device for measuring and indicating the distortion of pulses in a pulse train comprising a first timing capacitor, a variable impedance charging path connected between one side of said first timing capacitor and a negative voltage source, switching transistor means for connecting the other side of said first timing capacitor to substantially ground potential and to said negative potential source during the respective presence and absence of said pulses, means preventing said one side of said first timing capacitor from achieving a voltage more negative than a predetermined value, a second timing capacitor connected between said one side of said first timing capacitor and a point of reference potential, a storage capacitor responsive to voltage transitions on said second timing capacitor more negative than said point of reference potential, said negative voltage transitions occurring upon termination of a selected pulse of reduced pulse length relative to a standard pulse length, and an indicating network responsive to the charge present on said storage capacitor, including a meter having a shiftable pointer deflected in proportion to the magnitude of said charge.

2. A monitoring device as defined in claim 1, wherein said variable impedance charging path includes a variable potentiometer calibrated for a plurality of selected pulse transmission speeds for varying the discharging rate of said first and second timing capacitors.

3. A monitoring device for measuring and indicating the distortion of marking and spacing type pulses in coded signals comprising an input transistor biased to conduct during the application thereto of a first type of impulses in said signals and to be shifted to a non-conducting state upon application thereto of a second type of impulses in said signals, a first timing capacitor, a variable impedance charging path connected between one side of said first timing capacitor and a negative voltage source, switching transistor means responsive to conduction and non-conduction of said input transistor for connecting the other side of said first timing capacitor to substantially ground potential and to said negative potential source during the respective presence and absence of pulses of a selected one of said types, means preventing said one side of said first timing capacitor from achieving a voltage more negative than a predetermined value, a second timing capacitor connected between said one side of said first timing capacitor and a point of reference potential, a storage capacitor responsive to voltage transitions on said second timing capacitor more negative than said point of reference potential, said negative voltage transi-